United States Patent [19]
Kitazawa et al.

[11] Patent Number: 5,444,110
[45] Date of Patent: Aug. 22, 1995

[54] CROSSLINKING PLASTISOL AND PROCESS FOR CROSSLINKING VINYL CHLORIDE RESIN

[75] Inventors: Kouitu Kitazawa, Yokosuka; Kouichi Ohrui, Yokohama; Eitaro Nakamura, Tokyo, all of Japan

[73] Assignee: Nippon Zeon Co., Ltd., Tokyo, Japan

[21] Appl. No.: 189,610

[22] Filed: Feb. 1, 1994

[30] Foreign Application Priority Data

Feb. 2, 1993 [JP] Japan ................................ 5-037457

[51] Int. Cl.$^6$ ................................................. L08K 5/34
[52] U.S. Cl. ..................................... 524/100; 524/548
[58] Field of Search ................................ 524/100, 548

[56] References Cited

U.S. PATENT DOCUMENTS 5,162,380 11/1992 Hori et al. .............................. 521/90
5,319,028 6/1994 Nakamura et al. ................. 525/302

FOREIGN PATENT DOCUMENTS 51-112877 10/1976 Japan .
52-19783 2/1977 Japan .
4-211463 8/1992 Japan .
WO91/09076 6/1991 WIPO .

*Primary Examiner*—Peter D. Mulcahy
*Attorney, Agent, or Firm*—Birch, Stewart, Kolasch & Birch

[57] ABSTRACT

A crosslinking plastisol comprising (1) an epoxy group-containing vinyl chloride resin, (2) a triazine compound, (3) a plasticizer, and (4) an optional amino group- and/or thiol group-containing silane compound. The plastisol is capable of providing a shaped article or a laminated article, which has good heat distortion resistance, chemical resistance, resistance to whitening due to water, adhesion, transparency and thermal resistance on processing.

18 Claims, No Drawings

CROSSLINKING PLASTISOL AND PROCESS FOR CROSSLINKING VINYL CHLORIDE RESIN

BACKGROUND OF THE INVENTION (1) Field of the Invention

This invention relates a crosslinking vinyl chloride resin plastisol. More particularly, it relates to a crosslinking vinyl chloride resin plastisol used as a paste vinyl chloride resin for shaped articles and laminated articles, which has good heat distortion resistance, chemical resistance, resistance to whitening due to water, adhesion and thermal resistance on processing.

(2) Description of the Related Art

Laminated articles having a laminate structure comprised of a shaped article and a surface protective layer of a vinyl chloride resin (said layer may be hereinafter called as "top layer"), formed on the shaped article, have heretofore been widely used, wherein the shaped articles include, for example, (1) a shaped article made of a synthetic resin such as a vinyl chloride resin or polyurethane, (2) a steel plate or sheet, an aluminum foil, a metal plate or sheet, plaster, a wooden article, or paper, (3) a printed article having a printed image formed on a substrate such as exemplified in the above (2), and (4) an organic or inorganic fibrous or textile article.

As typical examples of such laminated articles, there can be mentioned floorings, (1) wall materials and cushioning materials, which have a foamed substrate made of a vinyl chloride resin or polyurethane, (2) a metal plate or sheet having a surface protective or decorative layer, and (3) flat articles which are comprised of a sheet-form material made of nylon, a polyester resin, a glass fiber or paper, and a surface coating of a vinyl chloride resin.

The formation of a top layer on various shaped articles is intended to give some physical and chemical properties to the shaped articles, such as tenacity, abrasion resistance, chemical resistance, resistance to whitening due to water (i.e., resistance to whitening or loss of transparency due to water-absorption or moisture-absorption), and flame retardancy, whereby the shaped articles are protected to enhance the practical performance, or a decorative effect is given to the shaped articles to enhance the commercial value.

Thus, a vinyl chloride resin is laminated on shaped articles to obtain a protective or decorative effect. However, a vinyl chloride resin is thermoplastic and is incorporated with a plasticizer in view of hand and feeling in the field of the above-listed laminated articles. Therefore the vinyl chloride-coated articles have a problem such that the softening point is low and the thermal resistance is poor.

To solve this problem, attempts have been made to crosslink a vinyl chloride resin. A typical example of the crosslinking of a vinyl chloride resin is effected by using a triazine compound (Japanese Examined Patent Publication No. 54-42390 and Japanese Examined Patent Publication No. 55-6501). The crosslinked vinyl chloride resin crosslinked with a triazine compound has improved thermal resistance, chemical resistance and abrasion resistance, but the resistance to whitening due to water and the thermal stability upon processing are drastically lowered. Therefore, the use of such a crosslinked vinyl chloride resin is limited and is used only in certain shaped articles, even though it is desirable to use a crosslinked vinyl chloride resin in wide fields.

The formation of a vinyl chloride resin top layer on a shaped article is carried out by a procedure wherein a vinyl chloride resin is directly coated on a shaped article, or a procedure wherein an adhesive is previously coated on a shaped article and then a vinyl chloride resin layer is adhered thereon. The latter procedure is not advantageous in that a step of coating with an adhesive and a step of drying the coated adhesive are indispensable. A procedure has been proposed wherein an isocyanate adhesive is incorporated in a vinyl chloride resin sol and the sol is coated on a shaped article. This procedure can be applied only for shaped articles made of nylon or a polyester.

SUMMARY OF THE INVENTION

In view of the foregoing, a primary object of the present invention is (1) to provide a crosslinking vinyl chloride resin plastisol capable of providing shaped articles and laminated articles, which have good heat distortion resistance, chemical resistance, resistance to whitening due to water, transparency and thermal resistance on processing, or (2) to provide a crosslinking vinyl chloride resin plastisol exhibiting an enhanced adhesion and being capable of providing shaped articles and laminated articles, which have the above-mentioned beneficial properties.

In accordance with the present invention, there is provided a crosslinking plastisol comprising (A) a vinyl chloride resin containing an epoxy group, (B) a triazine compound and (C) a plasticizer. By using an epoxy group-containing vinyl chloride resin and a triazine crosslinker, a crosslinked vinyl chloride shaped article having the above-mentioned beneficial properties can be obtained with the use of a smaller amount of a triazine crosslinker than that used for crosslinking a vinyl chloride resin not having an epoxy group and even without the use of a crosslinking accelerator which is generally indispensable for a conventional vinyl chloride resin plastisol.

In a preferred embodiment of the invention, a silane compound having an amino group and/or a thiol group is incorporated in the crosslinking plastisol in addition to the triazine compound. The resulting crosslinked vinyl chloride resin shaped article has the above-mentioned beneficial properties and the vinyl chloride resin plastisol exhibits an enhanced adhesion to a substrate having a hydroxyl group.

DESCRIPTION OF THE PREFERRED EMBODIMENTS

The epoxy group-containing vinyl chloride resin (A) used in the invention is in a spherical particulate form preferably having an average particle size of 0.05 to 5 $\mu$m, more preferably 0.5 to 5 $\mu$m. If the particle diameter is too large, a substantially long time is required for melting upon heating, and therefore, the effect intended by the invention is not readily obtained. If the particle diameter is too small, the plastisol exhibits a very high viscosity and thus a reduced processability.

In the epoxy group-containing vinyl chloride resin (A), the concentration of an epoxy group at the particle surface is preferably at least $1 \times 10^{-2}$% by weight and more preferably $5 \times 10^{-2}$ to $5 \times 10^{-1}$% by weight, and the concentration of an epoxy group in the entire particle is preferably not larger than 10% by weight and more preferably 0.5 to 5% by weight.

If the concentration of an epoxy group at the particle surface is smaller than $1 \times 10^{-2}\%$ by weight, the amount of the crosslinked epoxy group-containing vinyl chloride resin is lowered when the resin is crosslinked with a small amount of a crosslinker, and the desired resistance to whitening upon heating and thermal stability during processing are not readily obtained. If the concentration of an epoxy group in the entire particle exceeds 10% by weight, the plastisol exhibits a very high viscosity and thus a reduced processability. The concentration of an epoxy group at the particle surface and the concentration of an epoxy group in the entire surface can be determined by the methods hereinafter mentioned.

The epoxy group-containing vinyl chloride resin (A) is either (i) a copolymer comprising a predominant amount of vinyl chloride units, a minor amount of epoxy group-containing monomer units, and optional units of a monomer copolymerizable with vinyl chloride, or (ii) a modified polymer comprising a predominant amount of vinyl chloride units and optional units of a monomer copolymerizable with vinyl chloride, to which an epoxy group has been added.

The copolymerizable monomer which is copolymerized, if desired, with vinyl chloride is not particularly limited. As typical examples of the optional copolymerizable monomer, there can be mentioned (1) polymerizable unsaturated compounds having no reactive functional group which include unsaturated monocarboxylic acid esters such as methyl methacrylate, methyl acrylate, ethyl methacrylate, ethyl acrylate, propyl methacrylate, propyl acrylate, butyl methacrylate, butyl acrylate, octyl methacrylate, octyl acrylate, cyclohexyl methacrylate, cyclohexyl acrylate, benzyl methacrylate and benzyl acrylate; unsaturated dicarboxylic acid esters such as dimethyl maleate, dimethyl fumarate, diethyl maleate, diethyl fumarate, dipropyl maleate, dipropyl fumarate, dibutyl maleate, dibutyl fumarate, dioctyl maleate, dioctyl fumarate, dicyclohexyl maleate, dicyclohexyl fumarate, dibenzyl maleate and dibenzyl fumarate; vinyl ethers such as methyl vinyl ether, ethyl vinyl ether and propyl vinyl ether; vinyl esters of an organic acid such as vinyl acetate and vinyl propionate; olefins such as ethylene, propylene, butene-1 and pentene-1; aromatic monovinyl compounds such as styrene and α-methylstyrene; vinyl cyanide compounds such as acrylonitrile and methacrylonitrile; and vinylidene chloride; (2) carboxyl group-containing polymerizable unsaturated compounds which include unsaturated monocarboxylic acids such as acrylic acid, methacrylic acid, ethacrylic acid and cinnamic acid; unsaturated dicarboxylic acids and anhydrides thereof such as maleic acid, maleic anhydride, fumaric acid, itaconic acid and itaconic anhydride; and monoalkyl esters of an unsaturated dicarboxylic acid such as monoalkyl maleate, monoalkyl fumarate and monoalkyl itaconate; (3) amino group-containing polymerizable unsaturated compounds such as 2-aminoethyl methacrylate, 2-aminoethyl acrylate, 2-aminopropyl methacrylate, 2-aminopropyl acrylate, 3-aminopropyl methacrylate, 3-aminopropyl acrylate, 2-aminobutyl methacrylate, 2-aminobutyl acrylate, 3-aminobutyl methacrylate, 3-aminobutyl acrylate, 4-aminobutyl methacrylate, 4-aminobutyl acrylate, methacrylamide, acrylamide, N-2-aminoethyl methacrylamide, N-2-aminoethyl acrylamide, N-2-aminopropyl methacrylamide, N-2-aminopropyl acrylamide, N-3-aminopropyl methacrylamide and N-3-aminopropyl acrylamide; and (4) hydroxyl group-containing polymerizable unsaturated compounds such as 2-hydroxyethyl methacrylate, 2-hydroxyethyl acrylate, 2-hydroxypropyl methacrylate, 2-hydroxypropyl acrylate, 3-hydroxypropyl methacrylate, 3-hydroxypropyl acrylate, 2-hydroxybutyl methacrylate, 2-hydroxybutyl acrylate, 3-hydroxybutyl methacrylate, 3-hydroxybutyl acrylate, 4-hydroxybutyl methacrylate, 4-hydroxybutyl acrylate, dipentaerythritol hexamethacrylate and dipentaerythritol hexaacrylate. These copolymerizable monomers may be used either alone or in combination. The amount of the optional copolymerizable monomer units in the epoxy group-containing vinyl chloride resin is preferably not larger than 10% by weight based on the weight of the vinyl chloride resin.

As the epoxy group-containing monomer which is copolymerized with vinyl chloride and an optional comonomer for the preparation of the epoxy group-containing vinyl chloride resin, there can be mentioned, for example, glycidyl ethers of an unsaturated alcohol such as allyl glycidyl ether and methallyl glycidyl ether; glycidyl esters of an unsaturated acid such as glycidyl methacrylate, glycidyl acrylate, glycidyl p-vinylbenzoate, methylglycidyl itaconate, glycidyl ethylmaleate, glycidyl vinylsulfonate, glycidyl methallylsulfonate and glycidyl allylsulfonate; and epoxide olefins such as butadiene monoxide, vinylcyclohexene monoxide, 5,6-epoxyhexene and 2-methyl-5,6-epoxyhexene These epoxy group-containing monomers may be used either alone or in combination.

The method (i) for preparing the epoxy group-containing vinyl chloride resin by copolymerization of vinyl chloride, an epoxy group-containing monomer and an optional comonomer includes an emulsion polymerization method which is suitable for, e.g., a paste vinyl chloride resin, and a micro-suspension polymerization method. By these methods, a latex can be obtained wherein resin particles having an average particle diameter of 0.05 to 5 μm are uniformly dispersed.

The method (ii) for preparing the epoxy group-containing vinyl chloride resin by adding an epoxy group to a vinyl chloride polymer includes a method wherein a paste vinyl chloride resin is heat-treated or placed in contact with an alkali compound whereby the vinyl chloride resin is dehydrochlorinated, and the dehydrochlorinated resin is then treated with an organic peracid whereby the resin is epoxidized.

The epoxy group-containing vinyl chloride resin (A) used in the invention preferably has an average degree of polymerization of 600 to 4,000. The resin with an average degree of polymerization smaller than 600 has a poor mechanical strength. The resin with an average degree of polymerization larger than 4,000 requires a large quantity of heat for completely melting the resin particles.

The epoxy group-containing vinyl chloride resin (A) may be used either alone or two or more kinds of the epoxy group-containing vinyl chloride resins are used. The epoxy group-containing vinyl chloride resin (A) may be used in combination with not larger than 70% by weight, preferably not larger than 55% by weight, based on the total weight of the resin components, of a conventional plastisol vinyl chloride homopolymer resin (hereinafter may be called as "blend resin") or a copolymer resin comprised of vinyl chloride units and comonomer units. If the amount of the vinyl chloride homopolymer or copolymer resin used together with the epoxy group-containing vinyl chloride resin exceeds 70% by weight, the relative amount of the epoxy group-containing vinyl chloride resin to be crosslinked with the triazine compound becomes small, and thus, the intended crosslinking plastisol capable of giving a good resistance to whitening due to water and a good thermal stability upon processing cannot be obtained.

The triazine compound (B) used in the invention is selected from dithiol-s-triazine derivatives represented by the following formula [1], and metal salts thereof.

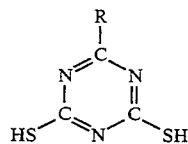

[1]

In the formula [1]R is selected from $OR^1$, $SR^1$, $NH_2$, $NHR^2$, $NR^3R^4$, a phenyl group and a naphthyl group, wherein $R^1$ is hydrogen or a hydrocarbon radical, and $R^2$, $R^3$ and $R^4$ are hydrocarbon radicals. Preferable examples of $R^1$ are a hydrocarbon radical of the formula $C_nH_{2n+1}$ where n is an integer of 1 to 8, and a phenyl group. Preferable examples of $R^2$, $R^3$ and $R^4$ are a hydrocarbon radical of the formula $C_mH_{2m+1}$ where m is an integer of 1 to 8, and $R^3$ and $R^4$ may form together a ring such as, for example, a morphorine ring.

If a vinyl chloride homopolymer is crosslinked with the triazine compound of the formula [1], the sulfur atoms having a high polarity react with chlorine atoms strongly bonded to carbon atoms, and thus, chlorine atoms in the vinyl chloride homopolymer are substituted by the sulfur atoms, whereby the polymer is crosslinked. In contrast, when the epoxy group-containing vinyl chloride resin (A) is crosslinked with the triazine compound of the formula [1], in addition to the above-mentioned reaction between the sulfur atoms and chlorine atoms, the basic —R group in the triazine compound is subjected to an addition reaction with the epoxy group in the resin (A) whereby the epoxy group is subjected to ring-opening and bonded to the triazine compound. Due to this reaction of the triazine compound with the epoxy group, it is believed that the epoxy group-containing vinyl chloride resin (A) can be crosslinked with a small amount of the triazine compound and even without a crosslinking accelerator.

The larger the basicity of the —R group in the triazine compound, the larger the crosslinkability of the triazine compound of the formula [1]. Among the values for R, —$NHR^2$ and —$NR^3R^4$ have a high basisity. As typical examples of the dithiol-s-triazine derivatives having such a high basisity, there can be mentioned 2-dimethylamino-4,6-dithiol-s-triazine, 2-butylamino-4,6-dithiol-s-triazine, 2-octylamino-4,6-dithiol-s-triazine, 2-cyclohexylamino-4,6-dithiol-s-triazine, 2-benzylamino-4,6-dithiol-s-triazine, 2-dibenzylamino-4,6-dithiol-s-triazine, 2-phenylamino-4,6-dithiol-s-triazine, 2-phenylbenzylamino-4,6-dithiol-s-triazine, 2-methylphenylamino-4,6-dithiol-s-triazine, 2-anilino-4,6-dithiol-s-triazine, 2-diphenylamino-4,6-dithiol-s-triazine, 2-α-naphthylamino-4,6-dithiol-s-triazine, 2-β-naphthylamino-4,6-dithiol-s-triazine, 2-benzylthio-4,6-dithiol-s-triazine, 2-ethoxy-4,6-dithiol-s-triazine, 2-phenoxy-4,6-dithiol-s-triazine and 2,4,6-trimercapto-s-triazine.

As metal salts of the dithiol-s-triazine compound of the formula [1], there can be mentioned alkali metal salts such as lithium, sodium and potassium salts, alkaline earth metal salts such as calcium, magnesium, barium, cadmium, zinc and strontium salts, an aluminum salt, a tin salt, a lead salt, a nickel salt, and organic metal salts such as a dibutyltin salt and a tributyltin salt.

The dithiol-s-triazine compound of the formula [1] can be used either alone or two or more of the compounds of the formula [1] can be used. Alternatively, the compound of the formula [1] can be used in combination with a metal salt of the compound of the formula [1]. The amount of the triazine compound is usually from 0.1 to 1 part by weight, preferably from 0.2 to 0.5 part by weight, based on the weight of the vinyl chloride resin. If the amount of the triazine compound is smaller than 0.1 part by weight, the degree of crosslinking is low. If the amount of the triazine compound exceeds 10 parts by weight, the thermal stability and the resistance to whitening due to water are not improved.

The plasticizer (C) used in the plastisol of the invention is not particularly limited, and conventional plasticizers for vinyl chloride resins can be employed. As examples of the plasticizer (C), there can be mentioned phthalic acid derivatives such as dimethyl phthalate, diethyl phthalate, dibutyl phthalate, di-(2-ethylhexyl) phthalate, di-n-octylphthalate, diisobutyl phthalate, diheptyl phthalate, diphenyl phthalate, diisodecyl phthalate, ditridecyl phthalate, diundecyl phthalate, di-(heptyl, nonyl, undecyl) phthalate, myristil benzyl phthalate, butyl benzyl phthalate, dinonyl phthalate and dicyclohexyl phthalate; isophthalic acid derivatives such as dimethyl isophthalate, di-(2-ethylhexyl) isophthalate and diisooctyl isophthalate; tetrahydrophthalic acid derivatives such as di-(2-ethylhexyl) tetrahydrophthalate, di-n-octyl tetrahydrophthalate and diisodecyl tetrahydrophthalate; adipic acid derivatives such as di-n-butyl adipate, di-(2-ethylhexyl) adipate, diisodecyl adipate and diisononyl adipate; azelaic acid derivatives such as di-(2-ethylhexyl) azelate, diisooctyl azelate and di-n-hexyl azelate; sebacic acid derivatives such as di-n-butylsebacate and di-(2-ethylhexyl) sebacate; maleic acid derivatives such as di-n-butyl malate, dimethyl malate, diethyl malate and di-(2-ethylhexyl) malate; fumaric acid derivatives such as di-n-butyl fumarate and di-(2-ethylhexyl) fumarate; trimellitic acid derivatives such as tri-(2-ethylhexyl) trimellitate, tri-n-octyl trimellitate, triisodecyl trimellitate, triisooctyl trimellitate, tri-n-hexyl trimellitate and triisononyl trimellitate; pyromellitic acid derivatives such as tetra-(2-ethylhexyl) pyromellitate and tetra-n-octyl pyromellitate; citric acid derivatives such as triethyl citrate, tri-n-butyl citrate, acetyltriethyl citate and acetyltri-(2-ethylhexyl) citrate; itaconic acid derivatives such as monomethyl itaconate, monobutyl itaconate, dimethyl itaconate, diethyl itaconate, dibutyl itaconate and di-(2-ethylhexyl) itaconate; oleic acid derivatives such as butyl oleate, glyceryl monooleate and diethylene glycol monooleate; ricinoleic acid derivatives such as methylacetyl ricinolate, butylacetyl ricinolate, glyceryl monoricinolate and diethylene glycol monoricinolate; stearic acid derivatives such as n-butyl stearate, glycerin monostearate and diethylene glycol distearate; other fatty acid derivatives such as diethylene glycol monolaurate, diethylene glycol dipelargonate, pentaerythritol fatty acid esters; phosphoric acid derivatives such as triethyl phosphate, tributyl phosphate, tri-(2-ethylhexyl) phosphate, tributoxyethyl phosphate, triphenyl phosphate, cresyl diphenyl phosphate, tricresyl phosphate, trixylenyl phosphate and tris(chloroethyl) phosphate; glycol derivatives such as diethylene glycol dibenzoate, dipropylene glycol dibenzoate, triethylene glycol dibenzoate, triethylene glycol di-(2-ethylbutyrate), triethylene glycol di-(2-ethylhexoate) and dibutyl methylene bisthioglycolate; glycerin derivatives such as glycerol monoacetate, glycerol triacetate and glycerol tributyrate; epoxy derivatives such as epoxidized soybean oil, epoxybutyl stearate, di-2-ethylhexyl epoxyhexahydrophthalate, di-isodecyl epoxy-hexahydrophthalate, epoxy-triglyceride, epoxidized octyl oleate and epoxidized decyl oleate; polyesters such as adipic acid polyesters, sebacic acid polyesters and phthalic acid polyesters; liquid epoxy resins such as water-bisphenol A-type liquid epoxy resin, novolak type liquid epoxy resin, polyglycol-type liquid epoxy resin, alicyclic epoxy resin, aliphatic epoxy resin, tetrafunctional epoxy resin having a tertiary amino nitrogen atom, urethane-modified epoxy resin and nitrile rubber-modified epoxy resin; adhesive plasticizers; and polymeric plasticizers such as an oligomer of diallyl phthalate and an oligomer of an acrylic monomer.

These plasticizers may be used either alone or in combination. The amount of the plasticizer is usually from 10 to 500 parts by weight, preferably 20 to 200 parts by weight, per 100 parts by weight of the vinyl chloride resin. If the amount of the plasticizer is smaller than 10 parts by weight, the viscosity of the plastisol is too high, and the plastisol is difficult to process. If the amount of the plasticizer is larger than 500 parts by weight, the plastisol is difficult to shape and the shaped articles have poor physical properties.

If desired, a silane compound (D) having an amino group and/or a thiol group may be incorporated in the plastisol of the invention. The amino group and/or thiol group of the silane compound is subjected to an addition reaction to the epoxy group of the vinyl chloride resin (A). In addition, the silane compound is subjected to hydrolysis and thus converted to a silanol, and is reacted with hydroxyl groups of a substrate to which the plastisol is to be adhered. Thus, due to the incorporation of the silane compound having an amino group and/or thiol group, the plastisol of the invention exhibits an enhanced adhesion to a substrate having hydroxyl groups.

As examples of the silane compound, there can be mentioned N-(2-aminoethyl)-3-aminopropylmethyldimethoxysilane, N-(2-aminoethyl)-3-aminopropyltrimethoxysilane, p-[N-(2-aminoethyl)-aminomethyl-phenetyltrimethoxysilane, 1-(3-aminopropyl)-1,1,3,3,3-pentamethyldisiloxane, 3-aminopropyltriethoxysilane, 3-aminopropyltris(trimethylsiloxy)silane, 3-[N-allyl-N-(2-aminoethyl)]aminopropyltrimethoxysilane, N-[3(trimethoxysilyl)propyl]diethylenetriamine, N-[3-(trimethoxysilyl)propyl]triethylenetetramine, 3-trimethoxysilylpropyl-m-phenylenediamine, 1,3-bis(3-aminopropyl)-1,1,3,3-tetramethyldisiloxane, α,ω-bis(3-aminopropyl)-polydimethylsiloxane, α,ω-bis(3-aminopropyl)-polydimethylsiloxane, N,N-bis[3-(methyldimethoxysilyl)propyl]amine, N,N-bis[3-(methyldimethoxysilyl)propyl]amine, N,N-bis-[3-(methyldimethoxysilyl)propyl]ethylenediamine, N,N-bis-[3-(trimethoxysilyl)propyl]amine, N,N-bis[3-(trimethoxysilyl)propyl]ethylenediamine, hexamethyldisilazane, α,ω-bis(3-mercaptopropyl)polydimethylsiloxane, 1,3-bis(3-mercaptopropyl)-1,1,3,3-tetramethyldisiloxane, 1,3-bis(mercaptomethyl)-1,1,3,3-tetramethyldisiloxane, α,ω-bis-(mercaptomethyl)polydimethylsiloxane, α,ω-bis(mercaptomethyl)polydimethylsiloxane, 3-mercaptopropyltris(trimethylsiloxy)silane, 3-mercaptopropyltrimethoxysilane, 1-(3-mercaptopropyl)-1,1,3,3,3pentamethyldisiloxane and 1-mercaptomethyl-1,1,3,3,3-pentamethyldisiloxane.

These silane compounds having an amino group and/or a thiol group may be used either alone or in combination. The amount of the silane compound is usually from 0.05 to 5 parts by weight, preferably 0.1 to 2 parts by weight, per 100 parts by weight of the vinyl chloride resin. If the amount of the silane compound is smaller than 0.05 part, the intended effect by the incorporation thereof is not obtained. If the amount of the silane compound exceeds 5 parts by weight, the viscosity of the plastisol is liable to increase during storage.

If desired, additives which are conventionally used for plastisol vinyl chloride resins may be incorporated in the plastisol of the invention. The additives include, for example, an inorganic filler, a heat stabilizer, a viscosity modifier, a diluent, a colorant and a flame retardant.

As examples of the inorganic filler, there can be mentioned calcium carbonate such as precipitated calcium carbonate, ground calcium carbonate and finely divided calcium carbonate, magnesium carbonate, silica, silicates such as talc, diatomaceous earth, clay and mica, aluminum hydroxide and alumina.

As examples of the heat stabilizer, there can be mentioned metal soaps such as-magnesium stearate, aluminum stearate, calcium stearate, barium stearate, zinc stearate, calcium laurate, barium laurate and zinc laurate, metal salts, e.g., sodium, zinc and barium salts, of phenol and naphthol, organotin compounds such as dibutyltin dilaurate and dibutyltin dimalate, and phosphorous acid salts such as diethyl phosphite, dibutyl phosphite, dioctyl phosphite, diphenylisodecyl phosphite, tricresyl phosphite, triphenyl phosphite, tris(-nonylphenyl) phosphite and triisooctyl phosphite.

As examples of the viscosity modifier and the diluent, there can be mentioned solvents such as xylene, solvent naphtha, mineral spirit, diisobutyl ketone and butyl acetate, and surface active agents. As examples of the flame retardant, there can be mentioned antimony trioxide, red phosphorus, zinc borate, organic bromides and chlorinated paraffins.

The method for preparing the plastisol of the invention is not particularly limited, and conventional methods can be employed. Usually, (A) the epoxy group-containing vinyl chloride resin, (B) the triazine compound, (C) the plasticizer and (D) the optional silane compound having an amino group and/or a thiol group are uniformly mixed together and the mixture is deaerated.

The invention will now be specifically described by the following examples that by no means limit the scope of the invention.

Characteristics of the vinyl chloride resin and the vinyl chloride resin plastisol were determined by the following procedures.

(1) Concentration of Epoxy Group at the Particle Surface of the Epoxy Group-containing Vinyl Chloride Resin In 300 ml volume wide-necked glass vessel with a stopper, 1 ml of an aqueous 1N hydrochloric acid solution and 100 ml of methanol were placed. The content was stirred by a magnetic stirrer for one hour and then subjected to an ultrasonic treatment at 40° C. Then the solution was titrated with a 1/10N alcoholic potassium hydroxide solution (the titrated quantity: a ml). Similarly the blank titrated quantity (b ml) is measured on a solution not containing the epoxy group-containing vinyl chloride resin. The concentration of an epoxy group at the particle surface of the epoxy group-containing vinyl chloride resin is calculated according to the following equation:

Concentration of epoxy group at the particle surface $$(\% \text{ by weight}) = 43 \times [(b-a)f_1 \times 0.1]/w \times 10^{-1}$$

wherein $f_1$ is a factor of the 1/10N KOH solution, and w is weight of a sample (g).

(2) Concentration of Epoxy Group in the Entire Particle of the Epoxy Group-containing Vinyl Chloride Resin In 300 ml volume wide-necked glass vessel with a stopper, 2 ml of an aqueous 1N hydrochloric acid solution and a solution of 1 g of an epoxy group-containing vinyl chloride resin in 100 ml of methyl ethyl ketone were placed. The content was stirred by a magnetic stirrer for one hour, and then, titrated with a 1/10N alcohlic potassium hydroxide solution (the titrated quantity: a ml). Similarly the blank titrated quantity b ml is measured on a solution not containing the epoxy group-containing vinyl chloride resin. The concentration of an epoxy group in the entire particle of the epoxy group-containing vinyl chloride resin is calculated according to the following equation:

Concentration of epoxy group in the entire particle $$(\% \text{ by weight}) = 43 \times [(b-a)f_1 \times 0.1]/w \times 10^{-1}$$

wherein $f_1$ is a factor of the 1/10N KOH solution, and w is weight of a sample (g).

(3) Average Degree of Polymerization

The average degree of polymerization is determined according to JIS K-6721.

(4) Degree of Crosslinking

A glass plate is coated with a vinyl chloride resin plastisol in an amount such that the resulting cured sheet has a thickness of 300 μm. The coated glass is placed for 3 minutes in a gear oven maintained at 200° C. whereby the plastisol is cured to obtain a sheet.

A square sample of a 2 cm×2 cm size is cut from the sheet. A 500 ml volume beaker is charged with at least 300 ml of tetrahydrofuran (hereinafter referred to as "THF"), and the sample is placed therein. The beaker is placed in an explosion-proof oven maintained at 80° C., and heated for 4 hours. Then the beaker is taken out and left to stand for one hour in an atmosphere at 23° C. Then the sample is taken out from THF and the lengths $L_1$ and $L_2$ of the two sides of the square sample are measured by using slide calipers. The degree of crosslinking is expressed by the volume equilibrium swell which is calculated according to the following equation:

$$\text{Volume equilibrium swell} = [(L_1 \times L_2)/4]^{3/2}$$

The smaller the volume equilibrium swell, the larger the degree of swelling, namely, the better the thermal shapability and chemical resistance.

(5) Thermal Stability

Ten small square samples having a 2 cm×2 cm size are cut from the sheet prepared for the determination of the degree of crosslinking (4). These samples are placed on an aluminum plate and the plate is placed on a rotating shelf of a gear oven maintained at 200° C. A sample is taken out with the lapse of every 5 minutes. This operation is continued until a blackened sample is taken out. The thermal stability is expressed by the time period for which the blackened sample is taken out.

(6) Resistance to Whitening due to Water

A square sample having a 5 cm×5 size is cut from the sheet prepared for the determination of the degree of crosslinking. The haze value of the sample is determined by a light transmission meter (Suga-tester, digital haze computer HGM-2DP).

A 100 ml volume glass vessel is charged with 50 ml of distilled water. The sample is placed therein and maintained at a constant temperature of 23° C. for 20 hours by a thermostat. Then the sample is taken out from the vessel and the haze values are measured 1 hour later, 2 hours later and 4 hours later.

(7) Adhesion

A glass plate having a 150 mm×150 mm size and a thickness of 1 mm is coated with the vinyl chloride resin plastisol to a thickness of 300 mm. The coated glass is cured in a gear oven maintained at 190° C. for 3 minutes or 10 minutes. After the coated glass is cooled, the coated surface is cut with a 1 cm width by a razor and the adhesion to glass is determined by a T-peel test method.

Examples 1 to 5 and Comparative Examples 1 to 3

The materials shown in Table 1 were mixed together according to the recipes shown in the same table for 10 minutes by using a pulverizing mixer (No. 18 supplied by Ishikawa Kojo K.K.) to prepare plastisols, and the plastisols were deaerated by a stirring deaerator ("KD-5" supplied by Daiwa Seiki K.K.) for 10 minutes. The properties of the plastisols were evaluated. The results are shown in Table 1.

For comparison, a conventional paste vinyl chloride homopolymer for a cured surface layer of a cushioning flooring was used instead of the epoxy group-containing vinyl chloride resin and [1,8-diaza-bicyclo-(5,4,0)undecene-7]phenol salt as a crosslinking accelerator was incorporated in the paste resin (Comparative Examples 1 and 2). The same conventional paste vinyl chloride homopolymer was used without any crosslinking agent (Comparative Example 3). The properties of the paste resins were evaluated. The results are shown in Table 1.

TABLE 1

|  | Examples | | | | | Comparative Examples | | |
| --- | --- | --- | --- | --- | --- | --- | --- | --- |
|  | 1 | 2 | 3 | 4 | 5 | 1 | 2 | 3 |
| Composition of plastisol (wt. parts) | | | | | | | | |
| PVC 1 *10 | 90 | 45 | 100 | 90 | 45 | — | — | — |
| PVC 2 *11 | — | 45 | — | — | 45 | 90 | 90 | 90 |
| PVC blend *12 | 10 | 10 | — | 10 | 10 | 10 | 10 | 10 |

TABLE 1-continued

|  | Examples | | | | | Comparative Examples | | |
| --- | --- | --- | --- | --- | --- | --- | --- | --- |
|  | 1 | 2 | 3 | 4 | 5 | 1 | 2 | 3 |
| Plasticizer *1 | 50 | 50 | 50 | 50 | 50 | 50 | 50 | 50 |
| Heat stabilizer *2 | 2 | 2 | 2 | 2 | 2 | 2 | 2 | 2 |
| Heat stabilizing aid *3 | 1 | 1 | 1 | 1 | 1 | 1 | 1 | 1 |
| Triazine compound (1) *4 | 0.3 | 0.3 | — | — | — | 1.5 | 0.3 | — |
| Triazine compound (2) *5 | — | — | 0.3 | 0.3 | 0.3 | — | — | — |
| Crosslinking accelerator *6 | — | — | — | — | — | 1.0 | 1.0 | — |
| Properties |  |  |  |  |  |  |  |  |
| Degree of crosslinking *7 | 8.4 | 4.9 | 11.0 | 11.4 | 7.8 | 7.8 | Dissolved | Dissolved |
| Thermal *8 stability (min) | 20 | 20 | 20 | 20 | 20 | 5 | 10 | 20 |
| Resistance to whitening *9 |  |  |  |  |  |  |  |  |
| Before im. | 24.2 | 29.0 | 2.1 | 24.0 | 36.5 | 32.8 | 34.1 | 32.1 |
| After im. 1 | 40.0 | 44.0 | 4.4 | 24.6 | 36.9 | 78.2 | 59.1 | 40.9 |
| After im. 2 | 31.8 | 36.7 | 3.0 | 24.3 | 36.4 | 67.2 | 42.4 | 34.6 |
| After im. 4 | 25.5 | 29.8 | 2.6 | 24.1 | 36.4 | 38.8 | 36.5 | 34.4 |

Note, *1 Plasticizer: dioctyl phthalate
*2 Octyl-tin-mercapto heat stabilizer
*3 Phosphate heat stabilizing aid
*4 Triazine compound (1): 2-dibutylamino-4,6-s-triazine
*5 Triazine compound (2): 2,4,6-trimercapto-s-triazine
*6 Crosslinking accelerator: 1,8-diaza-bicyclo-(5,4,0)undecene-7 phenol salt
*7 Degree of crosslinking: volume equilibrium swell in THF
*8 Thermal stability (min): blackened time at 200° C.
*9 Resistance to whitening due to water (haze value in %)
Before im.: before immersion in water
After im. 1: after the lapse of 1 hour after 20 hours' immersion in water
After im. 2: after the lapse of 2 hours after 20 hours' immersion in water
After im. 4: after the lapse of 4 hours after 20 hours' immersion in water
*10 PVC 1: An epoxy group-containing paste vinyl chloride resin ("Zeon F-821" supplied by Nippon Zeon Co.) having an average particle diameter of 1.0 μm, an average degree of polymerization of 1,250, an epoxy group concentration at the particle surface of 0.10% by weight and an epoxy group concentration in the entire particle of 1.03% by weight.
*11 PVC 2: A paste vinyl chloride homopolymer resin ("Zeon 43H" supplied by Nippon Zeon Co.) having an average particle diameter of 1.2 μm and an average degree of polymerization of 3,500.
*12 PVC blend resin: A paste blend vinyl chloride homopolymer resin ("Zeon ZXSH" supplied by Nippon Zeon Co.) having an average particle diameter of 30 μm and an average degree of polymerization of 3,500.

In Example 1 using an epoxy group-containing paste vinyl chloride resin, an enhanced degree of crosslinking was obtained with a minor amount of a triazine compound, which degree was approximately similar to that obtained with a relatively large amount of the triazine compound in Comparative Example 3 using a paste vinyl chloride homopolymer resin. The thermal stability and the resistance to whitening due to water in Example 1 were superior to those obtained in Comparative Examples 1 and 2 and were approximately similar to those obtained in Comparative Example 3 using a non-crosslinking vinyl chloride resin.

In Example 2 wherein a paste vinyl chloride homopolymer resin was used in combination with an epoxy group-containing paste vinyl chloride resin, a plastisol having a high degree of crosslinking was obtained without reduction of the thermal stability and the resistance to whitening due to water.

In Examples 3, 4 and 5 wherein a mercapto triazine compound was used, the degree of crosslinking was slightly lower than that in Examples 1 and 2 wherein an amino triazine compound was used, but was at an acceptable level. The chemical resistance in Examples 3, 4 and 5 was acceptable. The resistance to whitening due to water in Examples 3, 4 and 5 was superior to that in Examples 1 and 2.

In Comparative Example 2, the thermal stability and the resistance to whitening due to water were inferior to those in Comparative Example 3 wherein a crosslinking agent was not used. The degree of crosslinking in Comparative Example 2 also was not practically acceptable.

Example 6 and Comparative Examples 4 and 5

Plastisols were prepared and deaerated by the same procedures as those employed in Example 1, wherein the recipes shown in Table 2 were employed. The results of evaluation of the properties of the plastisols are shown in Table 2.

In Comparative Example 4, a triazine compound was not used and a silane compound was used. In Comparative Example 5, both a triazine compound and a silane compound were not used.

TABLE 2

|  | Example | Comp. Examples | |
| --- | --- | --- | --- |
|  | 6 | 4 | 5 |
| Composition of plastisol (wt. parts) |  |  |  |
| PVC 1 *9 | 100 | 100 | 100 |
| Dioctyl phthalate | 60 | 60 | 60 |
| Heat stabilizer *1 | 2 | 2 | 2 |
| Heat stabilizing aid *2 | 1 | 1 | 1 |
| Triazine compound (2) *3 | 0.3 | — | — |
| Silane compound *4 | 1 | 1 | — |
| Properties |  |  |  |
| Degree of crosslinking *5 | 7.4 | Dissolved | Dissolved |
| Adhesion strength (kg/cm$^2$)*6 |  |  |  |
| Cured at 190° C., 3 min | 1.4 | 0.6 | 0.1 |
| Cured at 190° C., 10 min | 2.5 | 2.3 | 1.0 |

| | Example | Comp. Examples | |
|---|---|---|---|
| | 6 | 4 | 5 |
| Thermal stability (min) *7 | 20 | 20 | 20 |
| Resistance to whitening *8 | | | |
| Before immersion | 2.1 | 1.8 | 1.8 |
| 1 hour after immersion | 4.4 | 4.0 | 3.8 |
| 2 hours after immersion | 3.0 | 2.7 | 2.5 |
| 4 hours after immersion | 2.6 | 2.3 | 2.1 |

Note. *1 Octyl-tin-mercapto heat stabilizer
*2 Phosphate heat stabilizing aid
*3 Triazine compound (2): 2,4,6-trimercapto-s-triazine
*4 γ-aminopropyltriethoxysilane
*5 Degree of crosslinking: volume equilibrium swell in THF
*6 Adhesion strength as measured after cured at 190° C. for 3 minutes, and adhesion strength as measured after cured at 190° C. for 10 minutes
*7 Thermal stability (min): blackened time at 200° C.
*8 Resistance to whitening due to water (haze value in %) as measured:
Before im.: before immersion in water
After im. 1: after the lapse of 1 hour after 20 hours' immersion in water
After im. 2: after the lapse of 2 hours after 20 hours' immersion in water
After im. 4: after the lapse of 4 hours after 20 hours' immersion in water
*9 PVC 1: the same as PVC 1 described in the footnote *10 of Table 1.

As shown in Table 2, in Example 6, an adhesion higher than those in Comparative Examples 4 and 5 could be obtained with a shorter curing time.

What is claimed is:

1. A crosslinking plastisol comprising (A) epoxy group-containing vinyl chloride resin particles having an average particle diameter of 0.05 to 5 μm, wherein the concentration of epoxy group at the particle surface is at least $1 \times 10^{-2}\%$ by weight and the concentration of epoxy group in the entire particle is not greater than 10% by weight, (B) a triazine compound and (C) a plasticizer.

2. The crosslinking plastisol as claimed in claim 1, wherein said epoxy group-containing vinyl chloride resin particles have an average particle diameter of 0.05 to 5 μ wherein the concentration of epoxy group at the particle surface is from $5 \times 10^{-2}$ to $5 \times 10^{-1}\%$ by weight and the concentration of epoxy group in the entire particle is from 0.5 to 5 % by weight.

3. The crosslinking plastisol as claimed in claim 1, wherein the amount of the triazine compound is from 0.1 to 1 part by weight per 100 parts by weight of the vinyl chloride resin particles.

4. The crosslinking plastisol as claimed in claim 1, wherein the amount of the plasticizer is from 10 to 500 parts by weight per 100 parts by weight of the vinyl chloride resin particles.

5. The crosslinking plastisol as claimed in claim 1, wherein the amount of the plasticizer is from 20 to 200 parts by weight per 100 parts by weight of the vinyl chloride resin particles.

6. The crosslinking plastisol as claimed in claim 1, wherein the vinyl chloride resin particles have an average degree of polymerization of 600 to 4,000.

7. The crosslinking plastisol as claimed in claim 1, which further comprises 0.05 to 5 parts by weight of a silane compound having at least one group selected from the group consisting of an amino group and a thiol group, per 100 parts by weight of the vinyl chloride resin particles.

8. A process for crosslinking a vinyl chloride resin, which comprises incorporating a plastisol comprising epoxy group-containing vinyl chloride resin particles having an average particle diameter of 0.05 to 5 μm, wherein the concentration of epoxy group at the particle surface is at least $1 \times 10^{-2}\%$ by weight and the concentration of epoxy group in the entire particle is not greater than 10% by weight, and a plasticizer, with 0.1 to 1 part by weight of a triazine compound per 100 parts by weight of said vinyl chloride resin particles.

9. The process for crosslinking a vinyl chloride resin as claimed in claim 8, wherein said plastisol further comprises 0.05 to 5 parts by weight, per 100 parts by weight of the vinyl chloride resin particles, of a silane compound having at least one group selected from the group consisting of an amino group and a thiol group.

10. The crosslinking plastisol according to claim 1, wherein said epoxy group-containing vinyl chloride resin particles have an average particle diameter of 0.5 to 5 μm.

11. The crosslinking plastisol according to claim 1, wherein the epoxy group-containing vinyl chloride resin particles (A) are selected from the group consisting of (i) a copolymer comprising vinyl chloride units and epoxy group-containing monomer units, (ii) a copolymer comprising vinyl chloride units, epoxy group-containing monomer units and units of at least one monomer copolymerizable with vinyl chloride, (iii) a modified polymer comprising vinyl chloride units, to which epoxy groups are added, and (iv) a modified polymer comprising vinyl chloride units and units of at least one monomer copolymerizable with vinyl chloride, to which epoxy groups are added.

12. The crosslinking plastisol according to claim 11, wherein the monomer copolymerizable with vinyl chloride is selected from the group consisting of methyl methacrylate, methyl acrylate, ethyl methacrylate, ethyl acrylate, propyl methacrylate, propyl acrylate, butyl methacrylate, butyl acrylate, octyl methacrylate, octyl acrylate, cyclohexyl methacrylate, cyclohexyl acrylate, benzyl methacrylate, benzyl acrylate, dimethyl maleate, dimethyl fumarate, diethyl maleate, diethyl fumarate, dipropyl maleate, dipropyl fumarate, dibutyl maleate, dibutyl fumarate, dioctyl maleate, dioctyl fumarate, dicyclohexyl maleate, dicyclohexyl fumarate, dibenzyl maleate, dibenzyl fumarate, methyl vinyl ether, ethyl vinyl ether, propyl vinyl ether, vinyl acetate, vinyl propionate, ethylene, propylene, butene-1, pentene-1, styrene, α-methyl-styrene, acrylonitrile, methacrylonitrile, vinylidene chloride, acrylic acid, methacrylic acid, ethacrylic acid, cinnamic acid, maleic acid, maleic anhydride, fumaric acid, itaconic acid, itaconic anhydride, monoalkyl maleate, monoalkyl fumarate, monoalkyl itaconate, 2-aminoethyl methacrylate, 2-aminoethyl acrylate, 2-aminopropyl methacrylate, 2-aminopropyl acrylate, 3-amino-propyl methacrylate, 3-aminopropyl acrylate, 2-aminobutyl methacrylate, 2-aminobutyl acrylate, 3-aminobutyl methacrylate, 3aminobutyl acrylate, 4-aminobutyl methacrylate, 4-aminobutyl acrylate, methacrylamide, acrylamide, N-2-aminoethyl methacrylamide, N-2-aminoethyl acrylamide, N-2-aminopropyl methacrylamide, N-2-aminopropyl acrylamide, N-3-aminopropyl methacrylamide, N-3-aminopropyl acrylamide, 2-hydroxyethyl methacrylate, 2-hydroxyethyl acrylate, 2-hydroxypropyl methacrylate, 2-hydroxypropyl acrylate, 3-hydroxypropyl methacrylate, 3-hydroxy-propyl acrylate, 2-hydroxybutyl methacrylate, 2-hydroxybutyl acrylate, 3-hydroxybutyl methacrylate, 3-hydroxybutyl acrylate, 4hydroxybutyl methacrylate, 4-hydroxybutyl acrylate, dipentaerythritol hexamethacrylate and dipentaerythritol hexa-acrylate.

13. The crosslinking plastisol according to claim 11, wherein the epoxy group-containing monomer is selected from the group consisting of allyl glycidyl ether, methallyl glycidyl ether, glycidyl methacrylate, glycidyl acrylate, glycidyl p-vinylbenzoate, methylglycidyl itaconate, glycidyl ethylmaleate, glycidyl vinylsulfonate, glycidyl methallylsulfonate, glycidyl allylsulfonate, butadiene monoxide, vinylcyclohexene monoxide, 5,6-epoxyhexene and 2-methyl-5,6-epoxyhexene.

14. The crosslinking plastisol according to claim 1, wherein the triazine compound (B) is a dithiol-s-triazine compound, or metal salt thereof, represented by

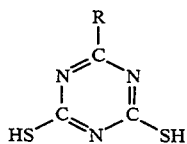

wherein R is selected from the group consisting of $OR^1$, $SR^1$, $NH_2$, $NHR^2$, $NR^3R^4$, a phenyl group and a naphthyl group, wherein $R^1$ is hydrogen or a hydrocarbon radical, and $R^2$, $R^3$ and $R^4$ are hydrocarbon radicals.

15. The crosslinking plastisol according to claim 1, wherein the triazine compound (B) is selected from the group consisting of 2-dimethylamino-4,6-dithiol-s-triazine, 2-butylamino-4,6-dithiol-s-triazine, 2-octylamino-4,6-dithiol-s-triazine, 2-cyclohexylamino-4,6-dithiol-s-triazine,2-benzylamino-4,6-dithiol-s-triazine, 2-dibenzylamino-4,6-dithiol-s-triazine, 2-phenylamino-4,6-dithiol-s-triazine, 2-phenylbenzylamino-4,6-dithiol-s-triazine, 2-methylphenylamino-4,6-dithiol-s-triazine,2-anilino-4,6-dithiol-s-triazine, 2-diphenylamino-4,6-dithiol-s-triazine, 2-α-naphthyl-amino-4,6-dithiol-s-triazine, 2-β-naphthylamino-4,6-dithiol-s-triazine, 2-benzylthio-4,6-dithiol-s-triazine, 2-ethoxy-4,6-dithiol-s-triazine, 2-phenoxy-4,6-dithiol-s-triazine and 2,4,6-trimercapto-s-triazine.

16. The crosslinking plastisol according to claim 1, wherein the amount of the triazine compound is from 0.2 to 0.5 parts by weight per 100 parts by weight of the vinyl chloride resin particles.

17. The crosslinking plastisol according to claim 1, wherein the plasticizer (C) is selected from the group consisting of dimethyl phthalate, diethyl phthalate, dibutyl phthalate, di-(2-ethylhexyl) phthalate, di-n-octylphthalate, diisobutyl phthalate, diphenyl phthalate, diheptyl phthalate, diisodecyl phthalate, ditridecyl phthalate, diundecyl phthalate, di-(heptyl, nonyl, undecyl) phthalate, myristil benzyl phthalate, butyl benzyl phthalate, dinonyl phthalate, dicyclohexyl phthalate, dimethyl isophthalate, di-(2-ethylhexyl) isophthalate, diisooctyl isophthalate, di-(2-ethylhexyl) tetrahydrophthalate, di-n-octyl tetrahydrophthalate, diisodecyl tetrahydrophthalate, di-n-butyl adipate, di-(2-ethylhexyl) adipate, diisodecyl adipate, diisonoyl adipate, di-(2-ethylhexyl) azelate, diisooctyl azelate, di-n-hexyl azelate, di-n-butylsebacate, di-(2-ethylhexyl) sebacate, di-n-butyl maleate, dimethyl maleate, diethyl maleate, di-(2-ethylhexyl) maleate, di-n-butyl fumarate, di-(2-ethylhexyl) fumarate, tri-(2-ethylhexyl) trimellitate, tri-n-octyl trimellitate, triisodecyl trimellitate, triisooctyl trimellitate, tri-n-hexyl trimellitate, triisononyl trimellitate, tetra-(2-ethylhexyl) pyromellitate, tetra-n-octyl pyromellitate, triethyl citrate, tri-n-butyl citrate, acetyltriethyl citrate, acetyltri-(2-ethylhexyl) citrate, monomethyl itaconate, monobutyl itaconate, dimethyl itaconate, diethyl itaconate, dibutyl itaconate, di-(2-ethylhexyl) itaconate, butyl oleate, glyceryl monooleate, diethylene glycol monooleate, methylacetyl ricinolate, butylacetyl ricinolate, glyceryl monoricinolate, diethylene glycol monoricinolate, n-butyl stearate, glycerin monostearate, diethylene glycol distearate, diethylene glycol monolaurate, diethylene glycol dipelargonate, pentaerythritol fatty acid esters, triethyl phosphate, tributyl phosphate, tri-(2-ethylhexyl) phosphate, tributoxyethyl phosphate, triphenyl phosphate, cresyl diphenyl phosphate, tricresyl phosphate, trixylenyl phosphate, tris(chloroethyl) phosphate, diethylene glycol dibenzoate, dipropylene glycol dibenzoate, triethylene glycol dibenzoate, triethylene glycol di-(2-ethylbutyrate), triethylene glycol di-(2-ethylhexoate), dibutyl methylene bisthioglycolate, glycerol monoacetate, glycerol triacetate, glycerol tributyrate, epoxidized soybean oil, epoxybutyl stearate, di-2-ethylhexyl epoxy-hexahydrophthalate, diisodecyl epoxy-hexahydrophthalate, epoxy-triglyceride, epoxyidized octyl oleate, epoxidized decyl oleate, adipic acid polyester, sebacic acid polyester, phthalic acid polyester, water-bisphenol A-type liquid epoxy resin, novolak type liquid epoxy resin, polyglycol-type liquid epoxy resin, alicyclic epoxy resin, aliphatic epoxy resin, tetrafunctional epoxy resin having a tertiary amino nitrogen atom, urethane-modified epoxy resin, nitrile rubber-modified epoxy resin, adhesive plasticizer, an oligomer of diallyl phthalate, and an oligomer of an acrylic monomer.

18. The crosslinking plastisol according to claim 7, wherein the silane compound is selected from the group consisting of N-(2-aminoethyl)-3-aminopropylmethyldimethoxysilane, N-(2-amino-ethyl)-3-aminopropyltrimethoxysilane, p-N-(2-aminoethyl)-aminomethylphenyltrimethoxysilane, 1-(3-aminopropyl)-1,1,3,3,3-pentamethyldisiloxane, 3-amino-propyltriethoxysilane, 3-aminopropyltris(trimethylsiloxy) silane, 3-(N-allyl-N-(2-aminoethyl))aminopropyltrimethoxysilane, N-(3-(trimethoxysilyl)propyl)diethylenetriamine, N-(3-(trimethoxysilyl)propyl)triethylenetetramine, 3-trimethoxysilylpropyl-m-phenylenediamine, 1,3-bis(3-aminopropyl)-1,1,3,3-tetramethyldisiloxane, α,ω-bis(3-aminopropyl)-polydimethylsiloxane, α,ω-bis(3-aminopropyl)-polydimethylsiloxane, N,N-bis((methyldimethoxysilyl)-propyl)amine, N,N-bis(3-methyldimethoxysilyl)propyl-)amine, N,N-bis(3-(methyldimethoxysilyl)propyl)amine, N,N-bis(3-(methyldimethoxysilyl)propyl)ethylenediamine, N,N-bis(3-(trimethoxysilyl)propyl)amine, N,N-bis(3-(trimethoxysilyl)propyl)-ethylenediamine, hexamethyldisilazane, α,ω-bis(3-mercaptopropyl)polydimethylsiloxane, 1,3-bis(3-mercaptopropyl)-1,1,3,3-tetramethyldisiloxane, 1,3-bis-(mercaptomethyl)-1,1,3,3-tetramethyldisiloxane, α,ω-bis(mercaptomethyl) polydimethylsiloxane, α,ω-bis(mercaptomethyl)polydimethylsiloxane, 3-mercaptopropyltris(trimethylsiloxy)silane, 3-mercaptopropyltrimethoxysilane, 1-(3-mercaptopropyl)-1,1,3,3,3-pentamethyldisiloxane and 1-mercaptomethyl-1,1,3,3,3-pentamethyldisiloxane.

* * * * *